Jan. 3, 1956  J. L. KELLER  2,729,543
REMOVAL OF SULFUR DIOXIDE FROM GASES CONTAINING THE SAME
Filed Dec. 12, 1950
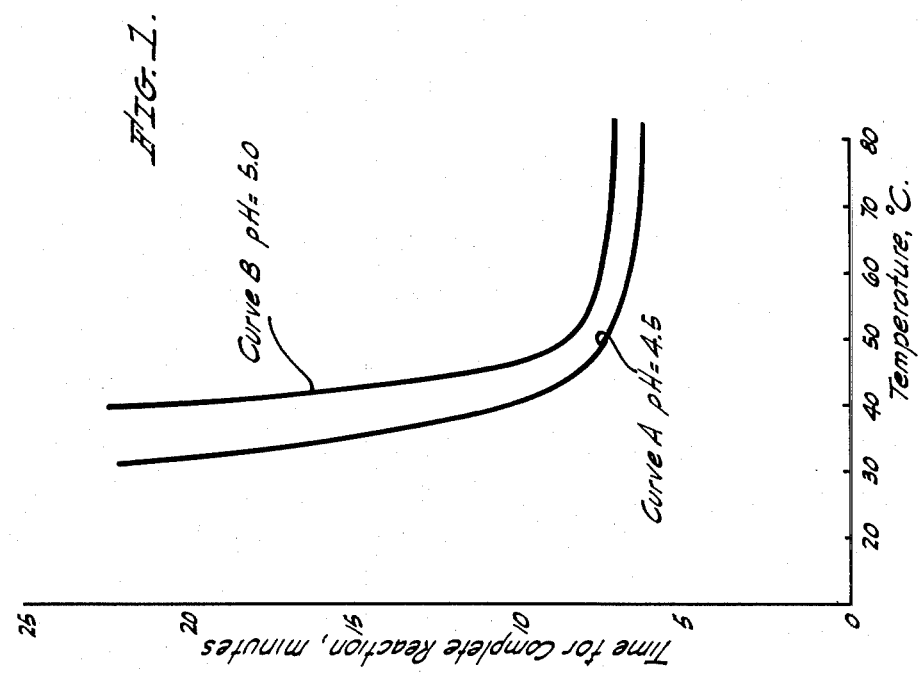
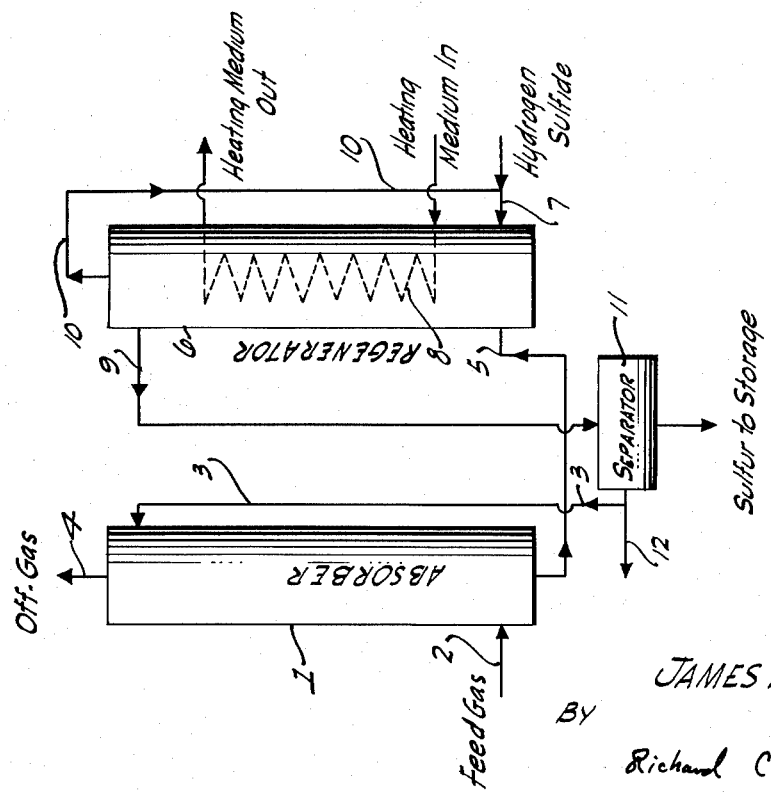
INVENTOR.
JAMES L. KELLER,
BY
Richard C. Hartman
ATTORNEY.

United States Patent Office 2,729,543
Patented Jan. 3, 1956

2,729,543

REMOVAL OF SULFUR DIOXIDE FROM GASES CONTAINING THE SAME

James L. Keller, Brea, Calif., assignor to Union Oil Company of California, Los Angeles, Calif., a corporation of California Application December 12, 1950, Serial No. 200,370

11 Claims. (Cl. 23—225)

This invention relates to a method for removing sulfur dioxide from gases containing the same, and in particular concerns improved procedure for carrying out a chemical reaction between a buffered aqueous absorbent containing absorbed sulfur dioxide and gaseous hydrogen sulfide to form free sulfur and thereby regenerate said absorbent.

In the combustion of sulfur-containing carbonaceous fuels, such as certain types of fuel oil, fuel gas, petroleum coke, coal, etc., the flue or stack gas produced comprises small amounts of sulfur dioxide, and the discharge of such gas into the atmosphere constitutes a serious hazard to animal and plant life. Even though the sulfur dioxide content of such gas may be quite small, e. g., below about 0.5 per cent, the volume of gas produced may be so large that very considerable amounts of sulfur dioxide are involved. Thus, a power plant may produce as much as 330,000,000 cubic feet per day of a flue gas containing 0.3 per cent of sulfur dioxide, amounting to a daily production of more than 170,000 pounds of sulfur dioxide. The necessity of providing means for treating waste gases of such nature for the removal of a large part of their sulfur doxide content before discharging them into the atmosphere is readily apparent.

Among the numerous processes which have been proposed for the removal of sulfur dioxide from gas mixtures comprising the same, that disclosed in the copending application of Keller, Pullen and Wiseman, Serial No. 120,578, filed October 10, 1949, now abandoned, is particularly advantageous from the standpoint of economy and simplicity of operation. According to said process the sulfur dioxide-containing feed gas is contacted with a liquid absorbent which selectively absorbs all or a large part of the sulfur dioxide. The stripped gas, more or less free of sulfur dioxide, is discharged to the atmosphere or is otherwise disposed of, and the rich absorbent is passed to a regeneration zone wherein it is treated with gaseous hydrogen sulfide. The latter reacts with the sulfur dioxide dissolved in the absorbent to form free precipitated sulfur which is filtered off, and the absorbent is returned to the initial absorption step where it serves to absorb the sulfur dioxide from further quantities of the feed gas. This process has proved highly advantageous in a number of respects. For example, it may be operated in a continuous cyclic manner and does not require the consumption of heat. It is capable of removing substantially all of the sulfur dioxide from gas mixtures containing only very small amounts of the same, and requires the consumption only of hydrogen sulfide which is frequently available as a waste product. The sulfur dioxide removed from the feed gas is practically quantitatively converted to finely-divided free sulfur of considerable value. The entire process may be carried out in conventional equipment and with low materials handling costs.

The success of the Keller et al. process lies in the use of an aqueous absorbent having dissolved therein a buffering agent capable of maintaining a pH value below about 6 throughout the process. Operation at pH values below about 4, however, involves the handling and processing of large volumes of corrosive liquid, and necessitates that the equipment employed be constructed of wood, ceramic materials, or special corrosion-resistant metal alloys. Accordingly, in order to permit the use of less expensive processing equipment it has been the practice to operate the process at pH values above about 4, usually between about 4 and about 5. When operating at such pH values and at atmospheric temperatures the reactions between the gaseous hydrogen sulfide and the rich absorbent solution which occur in the regeneration step take place relatively slowly.

In order to insure that the regeneration reaction be substantially quantitative so that the regenerated absorbent will have maximum absorption capacity for sulfur dioxide in the next succeeding cycle of operation it has been the practice to employ an excess of hydrogen sulfide in the regeneration step and to allow sufficient time for the absorption of hydrogen sulfide and the production of sulfur in the proportions required by the equation:

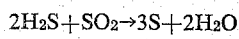

$$2H_2S + SO_2 \rightarrow 3S + 2H_2O$$

Inasmuch as such procedure involves allowing an excess of hydrogen sulfide to remain in contact with the absorbent over a relatively long period of time, it results in a substantial amount of free hydrogen sulfide becoming dissolved in the regenerated absorbent. When such hydrogen sulfide-containing regenerated absorbent is returned to the absorption step and comes into contact with the sulfur dioxide-containing feed gas, the dissolved free hydrogen sulfide reacts with the sulfur dioxide to form free sulfur which is precipitated within the absorption vessel. Such vessel almost invariably takes the form of a packed tower, and the precipitated sulfur tends to adhere to the packing material rather than be carried along in the liquid absorbent stream. Consequently, when operating as described above precipitated sulfur accumulates in the absorption tower and fills the interstices of the packing thereof so that the free cross-sectional area of the tower is reduced and the friction drop through the tower is increased. These values rapidly reach the point where the cost of forcing the large volume of feed gas through the clogged absorption tower becomes excessive, thereby requiring that the process be shut down while the packing is dumped and the accumlated free sulfur is removed.

An equally serious disadvantage attending operation as above described lies in the fact that in the presence of dissolved free hydrogen sulfide an appreciable amount of the free sulfur which is produced during the regeneration becomes colloidally dispersed in the absorbent and is extremely difficult to remove therefrom by customary methods of operation, e. g., filtration or centrifuging. Such colloidal sulfur gradually deposits throughout the system, and eventually it becomes necessary to disassemble and clean the various pumps, lines, towers, etc. Also, when the absorbent contains dissolved hydrogen sulfide, the handling thereof gives rise to health and safety hazards and involves further corrosion problems.

I have now found that these difficulties may be obviated by carrying out the regeneration step under such conditions that the hydrogen sulfide is consumed by reaction with the rich absorbent substantially as soon as it is dissolved therein, and by removing the regenerated absorbent from the regeneration zone as soon as the quantity of hydrogen sulfide required for stoichiometrically complete regeneration has dissolved in the absorbent. More particularly, I have found that at any given pH value above about 4, the rate at which the regeneration reaction takes place and the rate at which hydrogen sulfide dissolves in the absorbent may be controlled independently of one another. Accordingly, by suitably controlling those factors which determine the reaction rate while maintaining constant those factors which determine the rate at which free hydrogen sulfide dissolves in the absorbent, it is possible to prevent unreacted free hydrogen sulfide from accumulating in the absorbent during the regeneration step. By operating under such conditions and by removing the regenerated absorbent from the regeneration zone and out of contact with free hydrogen sulfide as soon as the stoichiometric proportion has dissolved, the occurrence of dissolved free hydrogen sulfide in the regenerated absorbent will be prevented, and the difficulties associated therewith will be avoided. By operating as herein disclosed the aforementioned plugging of the absorption tower, and the health and safety hazards and the corrosion problems involved in the handling of large quantities of aqueous hydrogen sulfide, are precluded. Furthermore, practically none of the free sulfur formed in the regeneration reaction is produced in colloidal form, and no trouble is experienced in completely separating the sulfur from the regenerated absorbent by conventional means.

In carrying out the regeneration step, it is obvious that both the rate of solution of gaseous hydrogen sulfide in the absorbent during regeneration and the average rate of the regeneration reactions must be sufficiently great to permit completion of regeneration in whatever time is provided by the capacity of the equipment and the rate of absorbent flow. Thus, if the concentration of absorbed sulfur dioxide is X moles/liter, and the time of residence in the regeneration vessel is Y minutes, then in order for regeneration to be complete, with the consumption of 2 moles of hydrogen sulfide per mole of sulfur dioxide, the rate of solution of gaseous hydrogen sulfide and the average rate of regeneration reaction must each be at least equal to 2X/Y moles of hydrogen sulfide/liter/minute. If the rate of reaction is 2X/Y moles/liter/minute and the rate of solution exceeds this value, then regeneration will be complete, but hydrogen sulfide will have dissolved faster than it was consumed by reaction and the regenerated absorbent will be more or less saturated with free hydrogen sulfide, with the undesirable results mentioned above. On the other hand, if the rate of solution is 2X/Y mole/liter/minute, the rate of reaction can equal but not exceed this value, since even if external conditions would permit a higher reaction rate the hydrogen sulfide obviously cannot be consumed by reaction any faster than it dissolves in the absorbent.

It has been found that when hydrogen sulfide reacts with sulfur dioxide in a rich absorbent having a pH value of about 4–6, the sulfur dioxide is consumed rapidly and substantially completely by reaction with only about 0.3 to 0.5 mole of hydrogen sulfide per mole of sulfur dioxide instead of the 2 moles required by the equation previously given. However, the absorbent is not by any means completely regenerated at this stage since little or no free sulfur is formed, most of the sulfur dioxide having been converted to thiosulfuric acid according to the equation:

$$2H_2S + 4SO_2 + H_2O \rightarrow 3H_2S_2O_3$$

Minor proportions of polythionic acids are also formed. These by-product acids tend to lower the pH of the buffered absorbent, and successful operation of the regeneration process to give substantially 100 per cent yields of sulfur results from the further reaction of such by-product acids with additional hydrogen sulfide to form elemental sulfur.

These subsequent reactions of thiosulfuric and polythionic acids are much slower than the initial reaction by which they were formed, and hence it is found that the overall rate of regeneration is determined primarily by the rate of the slowest reaction, i. e., the rate of the reaction between thiosulfuric acid and hydrogen sulfide. The rate of this reaction, and, correspondingly, of the overall regeneration reaction, depends upon the pH value of the absorbent, the temperature at which the reaction is carried out, and the concentration of thiosulfate ion in the absorbent. It does not depend to any substantial extent on the concentration of dissolved hydrogen sulfide or its pressure over the solution. Data illustrating these relations for the reaction of hydrogen sulfide with sodium thiosulfate in solutions buffered with sodium acetate and acetic acid and kept saturated with hydrogen sulfide by vigorous agitation in an atmosphere of hydrogen sulfide at controlled pressure are shown in the table below:

*Table*

| Thiosulfate Concentration, Moles/l. | pH | Partial Pressure of H²S, atm. | Temp., °C. | Reaction Rate, Moles H₂S Consumed/l./min. |
|---|---|---|---|---|

A. VARYING H₂S PRESSURE

| 0.80 | 4.5 | 0.48 | 25 | .00084 |
| 0.80 | 4.5 | 2.14 | 25 | .00086 |

B. VARYING pH

| 0.40 | 3.5 | 0.97 | 25 | .00099 |
| 0.40 | 4.5 | 0.97 | 25 | .00034 |
| 0.40 | 5.5 | 0.97 | 25 | .00010 |

C. VARYING TEMPERATURE

| 0.40 | 4.5 | 0.97 | 25 | .00034 |
| 0.40 | 4.5 | 0.97 | 40 | .00130 |

D. VARYING THIOSULFATE CONCENTRATION

| 0.20 | 4.5 | 0.97 | 25 | .00011 |
| 0.40 | 4.5 | 0.97 | 25 | .00034 |
| 0.80 | 4.5 | 0.97 | 25 | .00092 |

The data in section A of the table show that the rate of reaction is independent of the hydrogen sulfide pressure. Since such pressure largely determines the rate at which hydrogen sulfide dissolves in the absorbent, it will be seen that the rate of reaction is substantially independent of the rate of solution, although, as explained above, it cannot exceed the rate of solution.

As is shown by the data in section B of the table, the pH value is of inverse influence on the reaction rate, i. e., an increase in pH value effects a decrease in reaction rate. As previously explained, however, operation at pH values below about 4 necessitates the use of special corrosion-resistant equipment which is uneconomical for large-scale use. Accordingly, the extent to which the reaction rate can be increased by decreasing the pH value is very limited, and for all practical purposes the process may be considered to be economically operable only within a narrow pH range.

In contrast to the effect of pH upon the reaction rate, temperature is of positive influence, and a relatively small increase will effect a marked increase in the reaction rate. The data in section C of the table establish this fact, and Figure 1 of the accompanying drawing illustrates it graphically. The data from which the curves of the figure are plotted were obtained by agitating rich absorbent liquors in an atmosphere of hydrogen sulfide under a pressure of 2.2 atm. at various temperatures and determining the time required for consumption of 2 moles of SO₂ per mole of H₂S. The data represented by curve A were obtained when employing a rich absorbent consisting of an aqueous solution containing 0.5 mole/liter of sodium sulfosuccinate, 2.0 mole/liter of sodium thiosulfate, and 0.1 mole/liter of absorbed sulfur dioxide. This absorbent had a pH value of about 4.5. Curve B represents the data obtained when employing a similar absorbent buffered to a pH value of about 5.0. It will be noted from these curves that as the reaction temperature is increased to values above atmospheric temperature the time required for completion of the reaction decreases very rapidly until a certain critical temperature is reached, after which further increases in temperature are relatively ineffective with respect to decreasing the reaction time. This critical temperature is that at which the rate of reaction just equals the rate of solution of hydrogen sulfide. At higher temperatures the hydrogen sulfide is consumed by reaction as fast as it dissolves. A comparison of curves A and B shows that such critical temperature decreases with decreasing pH value. It has been found that when operating at a pH value of about 4 the critical temperature is about 40° C., whereas when operating at a pH value of about 6 such temperature is about 70° C. It will accordingly be apparent that the desired minimum reaction time for operation at a pH value between about 4 and about 6 will be attained by carrying out the reaction at a minimum temperature between about 40° C. and about 70° C., with the optimum temperature within this range being determined by the particular pH value selected. A comparison of curves A and B along any given temperature ordinate also illustrates the aforementioned negative influence of pH value upon the reaction rate.

As is shown by the data in section D of the table, the effect of increasing the concentration of thiosulfate ion is similar to that of increasing the temperature. These data indicate that the reaction rate varies approximately as the 3/2 power of the thiosulfate ion concentration. As such concentration is increased, as for example by adding a soluble thiosulfate salt to the absorbent, the time required for the regeneration decreases and approaches a minimum which represents the time necessary for solution of the required amount of hydrogen sulfide.

If the temperature is high enough so that this minimum regeneration time can be reached before the solution becomes saturated with thiosulfate salt, then further increase in thiosulfate concentration will gain no further reduction in regeneration time. Under such conditions, the hydrogen sulfide is consumed by reaction as rapidly as it dissolves, and the absorbent solution will be essentially devoid of free dissolved H₂S throughout the regeneration operation.

When the cyclic process is first started up, employing fresh absorbent buffer solution which contains no thiosulfate ion, the regeneration reaction is exceedingly slow and is not complete within any reasonable length of time. The yield of sulfur is correspondingly appreciably less than theoretical, and there is formed a substantial quantity of thiosulfuric acid which lowers the pH of the absorbent. When an alkali is added to return the pH to its initial value, this by-product acid is neutralized to form a thiosulfate salt in solution. As operation continues the thiosulfate accumulates in solution, so that the rate of its own reaction with hydrogen sulfide increases until, after several cycles of operation at a fixed regeneration time, fixed temperature and fixed hydrogen ion concentration, the amounts of thiosulfuric acid formed and decomposed by reaction with the hydrogen sulfide in each cycle are equal. Simultaneously the yield of sulfur increases with continued operation, and becomes substantially quantitative after a relatively few cycles of operation. The concentration of thiosulfate ion in the absorbent thus reaches a steady state value. If no further addition of alkali is made, this value neither increases nor decreases to any substantial extent from cycle to cycle. The exact concentration of thiosulfate ion so attained in the absorbent under steady state conditions depends upon the pH value of the absorbent, the concentration of absorbed sulfur dioxide, the temperature of regeneration, the rate of hydrogen sulfide solution, and the time allowed for regeneration. However, under any given set of operating conditions the steady state concentration of thiosulfate ion is substantially fixed. Such concentration is referred to herein as the "inherent" concentration, since it is attained by reason of the inherent nature of the reaction rather than by any actual addition of thiosulfate from external sources and its value is determined by the operating conditions employed.

In previous practice of the process the concentration of thiosulfate ion in the absorbent was that attained by allowing the reaction to take its natural course as above explained, i. e., the inherent concentration, and the rate of the reaction was limited accordingly. According to the practice of the present invention, however, the thiosulfate concentration is artificially increased to a value above that of the inherent concentration, as for example by adding sodium thiosulfate to the absorbent or by the addition of a soluble alkali, such as sodium hydroxide, to the absorbent after the inherent steady state concentration is reached, and a corresponding increased reaction rate is thereby attained. The extent to which the thiosulfate concentration may be increased is limited only by the extent of the solubility in the absorbent, but is usually not greater than about 3.0–3.5 moles/liter.

To summarize the foregoing, I have found that at any given pH value the rate at which the aforementioned regeneration reaction takes place may be greatly increased by increasing the temperature at which it is carried out and/or by increasing the thiosulfate ion concentration above the normal steady state value which is inherently characteristic of the particular absorbent and operating conditions employed. Neither of these factors is of significant influence on the rate at which hydrogen sulfide dissolves in the absorbent. At any given pH value, such rate is governed primarily by the partial pressure of the gaseous hydrogen sulfide above the liquid absorbent and by the efficiency of mixing, both of which factors are more or less fixed according to the design of the equipment employed. Accordingly, the accumulation of free hydrogen sulfide in the absorbent during the regeneration step may be avoided by carrying out the regeneration reaction at an elevated temperature and/or by increasing the thiosulfate ion concentration in the absorbent to a value above that of the inherent concentration. The invention thus consists of an improvement in the aforesaid process of absorbing sulfur dioxide in an absorbent comprising an aqueous solution of a buffering agent capable of maintaining a pH value between about 4 and about 6 and thereafter regenerating the rich absorbent by treatment with gaseous hydrogen sulfide, said improvement consisting in the steps of either (1) increasing the concentration of thiosulfate ion in the absorbent to a value above that of the inherent concentration, or (2) carrying out the regeneration reaction at an elevated temperature below the boiling point of the absorbent sufficient to increase the rate of the regeneration reaction to a value substantially equal to that of the rate at which hydrogen sulfide dissolves in the absorbent, or both (1) and (2), and withdrawing the regenerated absorbent out of contact with free hydrogen sulfide substantially as soon as the stoichiometric amount of free hydrogen sulfide has dissolved in the absorbent.

The manner in which this process is carried out may be more fully understood from the following detailed description of the invention, made with reference to Figure 2 of the accompanying drawing which diagrammatically represents a flow sheet illustrating the practice of one embodiment of the invention. Referring now to said flow sheet, the absorption step is carried out in absorber 1, which may conveniently be of the packed tower type, shown arranged for countercurrent operation. The feed gas comprising sulfur dioxide is introduced at the bottom of the absorber through conduit 2, and rises countercurrent to a descending stream of absorbent introduced at the top through conduit 3. The non-absorbed gases, substantially free of sulfur dioxide, are withdrawn from the top of the absorber through conduit 4 and are discarded or otherwise disposed of. A stream of absorbent rich in sulfur dioxide is withdrawn from the absorber through conduit 5 and is passed to regenerator 6. The regenerator is shown arranged for concurrent operation, with both the rich absorbent and hydrogen sulfide being introduced at the bottom through conduits 5 and 7, respectively. Since the regeneration reaction is carried out at an elevated temperature, regenerator 6 is shown equipped with an internal heating coil 8 through which hot water, steam, or other heating medium may be passed. It will be understood, of course, that the heating means may be located externally, and, as is hereinafter more fully explained, may be dispensed with entirely, the heating being attained by other means. Coil 8 is shown merely to indicate that the regeneration is effected at an elevated temperature. Within the regenerator, the hydrogen sulfide rises concurrently with the ascending stream of rich absorbent and reacts with the sulfur dioxide which is absorbed therein to form free precipitated sulfur. The latter is withdrawn from the top of the regenerator through conduit 9 in the form of a slurry or suspension in the absorbent. Conduit 10 is provided to return any unreacted hydrogen sulfide from the top of the regenerator to hydrogen sulfide inlet conduit 7. The suspension of precipitated sulfur withdrawn from the regenerator through conduit 9 is passed to a separator 11, which may take the form of a continuous filter, wherein the solid sulfur is separated from the absorbent and is passed to storage. The regenerated absorbent taken from the separator is returned to the absorber through conduit 3. Inasmuch as water is formed in the reaction which takes place in the regenerator, and would accumulate in the system unless means were provided for its disposal, conduit 12 is shown arranged for withdrawing a portion of the aqueous absorbent equal in amount to the water formed by the reaction in the regenerator. As is more fully explained hereinafter, in certain cases all or a part of this amount of water may be lost from the system by evaporation, particularly in the absorber, so that conduit 12 may be considered as representing the total removal of water from the system either by evaporation or by actual withdrawal or both.

Considering the above-described process in somewhat greater detail as regards the separate steps, the absorption step is a conventional gas-liquid contacting operation, and may be carried out in conventional equipment such as a packed tower operating on the countercurrent principle. Usually the operation involves the handling of very large volumes of gas containing only small amounts of sulfur dioxide, and accordingly it is desirable that the absorption tower and its packing be of such design that a maximum of gas-liquid contact area is provided with a minimum of obstruction to the gas flow so as to avoid the necessity of compressing the large volume of gas to overcome the back-pressure within the tower. In most instances it is desirable that the friction drop through the tower be not greater than about 12 inches of water. Since the absorption capacity of the absorbent increases with decreasing temperature, it is necessary that the absorption step be carried out at a relatively low temperature. When the feed gas is a combustion product, as will often be the case, means for cooling such gas prior to its introduction into the absorption tower should be provided. Such means may comprise various types of heat economizers or waste heat boilers or a simple water spray. The heat recovered from the feed gas in this manner may be employed in heating the rich absorbent in the regeneration step which is carried out at an elevated temperature. However, I have found that when operating at pH values above about 4, the absorption step may be carried out efficiently and economically at temperatures as high as about 60° C. which is within the preferred range of temperatures for effecting the regeneration reaction. Accordingly, it is usually preferred to cool the feed gas, not to atmospheric temperature as has previously been the practice, but merely to such temperature that the rich absorbent which is taken from the absorption tower and passed to the regeneration step is of such temperature that the desired temperature is maintained in the regeneration step without the addition of heat from external sources. Such mode of operation constitutes one of the advantageous features of the present process since it permits direct use of the heat content of the feed gas in the regeneration step and avoids the cost of supplying external heat during regeneration.

The absorbent supplied to the absorption tower is of the type disclosed in the aforesaid application of Keller et al., i. e., an aqueous solution of one or a mixture of buffering agents adapted to maintain the pH of the absorbent at a value between about 4 and about 6, preferably between about 4 and about 5. It will be understood, of course, that the pH value of the absorbent decreases somewhat as the absorption proceeds, so that the pH of the rich absorbent taken from the absorption step and passed to the regeneration step will be somewhat lower than that of the lean absorbent supplied to the absorption step. Conversely, the pH value of the rich absorbent increases during regeneration, so that the sulfur dioxide-free regenerated absorbent withdrawn from the regeneration step will have a pH substantially the same as that of the absorbent initially supplied. Accordingly, it is to be understood that the pH values specified herein and in the appended claims are those of the lean absorbent which is supplied to the absorption step.

A number of agents capable of buffering within the range of pH 4 to pH 6 may be employed in preparing the aqueous absorbent. Among such agents there may be mentioned by way of example: basic aluminum salts, basic beryllium salts, mixtures of normal and acid salts of weak organic acids such as citric acid, lactic acid, malic acid, isovaleric acid, glycolic acid, mandelic acid, tartaric acid, oxalic acid, succinic acid, glutaric acid, diglycolic acid and mixtures of such salts with the free acids themselves, etc. Absorbents satisfactory for use in the present process may be prepared from any of such buffering agents or their equivalents simply by dissolving sufficient of the buffer or buffer mixture in water to provide the required buffering action. Salt-type buffering agents of low volatility are usually preferred in the interests of minimizing loss by evaporation.

A class of absorbents which has been found particularly suitable comprises aqueous solutions of water soluble salts of sulfosuccinic acid, e. g., aqueous solutions of ammonium, alkali-metal or alkaline-earth metal sulfosuccinates of about 0.2–2.5 molar or greater concentration. Such solutions may be prepared in situ, so to speak, by initially supplying to the absorber a 0.2–2.5 molar solution or suspension of the corresponding maleate prepared by dissolving the appropriate quantities of maleic anhydride and an ammonium, alkali-metal or alkaline-earth metal base in water. As the process proceeds, the sulfur dioxide in the feed gas reacts chemically with the maleate salt to form the corresponding sulfosuccinate salt until all of the maleate salt has been consumed, whereupon the sulfur dioxide will be extracted from the feed gas simply by absorption in the sulfosuccinate solution. The pH of the sulfosuccinate solution can be varied by varying the amount of base employed in preparing the initial maleate solution. For example, the initial solution may be prepared by dissolving one mole each of maleic anhydride and sodium carbonate in one liter of water to obtain a molar solution of di-sodium maleate. Such solution will react with one mole of sulfur dioxide to form a molar solution of di-sodium acid sulfosuccinate having a pH of about 3.8. Higher pH values may be secured by adding small additional quantities of sodium carbonate.

When it is desired that the absorbent contain thiosulfate ion in excess of the inherent concentration as previously explained, either a soluble thiosulfate, e. g., sodium thiosulfate, or a soluble alkali is included in the absorbent. The quantity to be employed depends upon the value of the inherent concentration, but such value may readily be determined experimentally and the quantity of added thiosulfate or alkali calculated accordingly. Usually, it is desirable that the absorbent contain between about 0.5 and about 3.5, preferably between about 1 and about 3 moles per liter of thiosulfate ion.

The feed gas-to-absorbent ratio maintained within the absorption tower will depend upon a large number of factors, the most important of which are the nature of the feed gas, i. e., its sulfur dioxide content, and the proportion of sulfur dioxide to be removed therefrom, the nature of the absorbent, and the efficiency of the absorption tower. Ordinarily, however, such ratio will be between about 100 to 1 and about 5000 to 1 by volume. Thus, in contacting a feed gas containing about 0.25 per cent by volume of sulfur dioxide with an absorbent consisting of a 0.5 molar aqueous solution of sodium sulfosuccinate having a pH of about 4.5 in a tower packed with Berl saddles, the sulfur dioxide content of the gas can be reduced to 0.05 per cent by volume by employing a gas-to-absorbent ratio of about 1700 to 1 by volume. A greater reduction in the sulfur dioxide content of the feed gas can be secured by employing a lower gas-to-absorbent ratio.

The regeneration step is preferably carried out in an elongated zone which may conveniently take the form of an absorption tower. In this case the tower may be of the bubble-cap or perforated tray type which provides a large gas-liquid contact area and promotes highly turbulent mixing of the gas and liquid. The desirability of employing a low friction drop type of tower for the regeneration step is not nearly as important as in the absorption step since the volume of hydrogen sulfide introduced into the regeneration tower is relatively small and the cost of compressing such small volume of hydrogen sulfide to overcome the back pressure within the tower is not excessive. However, since solid precipitated sulfur is produced within the tower, its construction should be such that it does not readily become clogged with sulfur particles. Alternatively, the regeneration may be carried out in simple closed vessels with efficient mixing of the gas and liquid being secured by mechanical stirring devices, or by circulation of the gas-liquid mixture through the same or a number of vessels, or by recirculation of excess hydrogen sulfide. If desired, the hydrogen sulfide may be introduced through dispersing devices, although such devices should be of such construction that they do not become clogged with the precipitated sulfur.

As previously stated, the objects of the invention are achieved in part by carrying out the regeneration step at an elevated temperature. Under ordinary conditions of operation at a pH value of about 4, the minimum operable temperature is about 40° C. At the maximum pH value of about 6, the minimum operable temperature is about 70° C. Operation at temperatures above the operable minimum is of course possible, but because of the nature of the relationship between the temperature and the time for the reaction to become complete, little advantage lies in operating at temperatures substantially above the minimum. Accordingly, the regeneration is usually carried out at a temperature which is above the operable minimum only by an amount sufficient to provide for variations in control. The maximum operable temperature is the boiling point of the absorbent. When the feed gas comprises a hot combustion product, it is preferred to operate the regeneration step at a temperature between about 40° C. and about 60° C. employing an absorbent having a pH value between about 4 and about 5 so that the sensible heat of the feed gas may be utilized directly to attain the elevated temperature in the regeneration zone as previously explained. Alternatively, the requisite elevated temperature in the regeneration zone may be attained by supplying heat from an external source, e. g., by circulating steam through suitable coils located within the regeneration tower.

In order to avoid solution of excess hydrogen sulfide in the regenerated absorbent, the latter is removed from the regeneration zone substantially as soon as the stoichiometric amount of hydrogen sulfide has dissolved. This is readily accomplished simply by controlling the rate at which the absorbent passes through the regeneration zone so that the time of passage therethrough is at most only slightly greater than the time required for such amount of hydrogen sulfide to dissolve. In most instances such time is of the order of 5 minutes, and the length of time over which the absorbent is in contact with hydrogen sulfide is preferably not greater than about 15 minutes when operating at atmospheric pressure or only slightly above. Previously, it was the practice to allow the absorbent to remain in contact with the hydrogen sulfide within the regeneration zone for as long as 120 minutes, such period of time being required for completion of the reaction at the low temperatures employed.

In order to avoid accumulation of precipitated sulfur in the regeneration vessel, it is preferred to employ concurrent flow of the absorbent and hydrogen sulfide. Thus, the hydrogen sulfide and rich absorbent are preferably both introduced into the bottom of a gas-liquid contacting tower, the upper part of which serves as a separation zone wherein excess hydrogen sulfide is separated from the regenerated absorbent. The latter is withdrawn from said zone and passed to a separator, and excess hydrogen sulfide is removed from the top of the tower and recycled. As stated above, the rate of flow of the absorbent through the tower is such that the required amount of hydrogen sulfide dissolves and reacts with the rich absorbent during passage of the latter through the tower.

The regeneration reaction requires that 2 moles of hydrogen sulfide be provided for each mole of absorbed sulfur dioxide. Accordingly, the rate at which the hydrogen sulfide is introduced into the regeneration zone should be such that the mole ratio of hydrogen sulfide to sulfur dioxide be at least 2/1. However since the rate of consumption of hydrogen sulfide is purposely caused to be substantially equal to its rate of solution in the absorbent through the use of increased temperature and/or increased thiosulfate concentration, higher mol ratios may be employed without causing consumption of excess hydrogen sulfide and resultant over-regeneration, i. e., a net reduction in thiosulfate concentration and increase in pH. Usually a mole ratio of between about 2.2/1 and about 4/1 is employed. The excess hydrogen sulfide may be recovered for reuse in the process. The consumption of hydrogen sulfide is conveniently controlled by regulating the pressure of hydrogen sulfide according to the pH value of the regenerated absorbent. Thus if the pH drops below a preselected value the pressure of hydrogen sulfide is raised, thereby causing more hydrogen sulfide to dissolve and react which in turn raises the pH back to said preselected value. Alternatively, if the pH rises above the preselected value, the pressure of hydrogen sulfide is reduced, thereby causing less hydrogen sulfide to dissolve and react and permitting the pH to drop back to the preselected value. Automatic control means may be employed to vary the pressure in accordance with the pH value in this manner.

The product obtained from the regeneration step is a slurry or suspension of very finely divided sulfur in the aqueous absorbent. However, when operating as herein disclosed, little or none of the sulfur is formed in colloidal form, and separation of the sulfur from the liquid absorbent is readily accomplished by filtration or centrifuging employing conventional equipment, e. g., a continuous vacuum filter. The filter cake usually contains an appreciable amount of adsorbed buffering agent, and hence it may be desirable to wash the sulfur one or more times with water to remove such agent. If desired, the wash water may be evaporated or otherwise treated to recover the buffering agent dissolved therein. The washed sulfur may be dried by conventional means and marketed as an article of commerce. Because of its finely divided state it is well adapted for agricultural applications. Alternately the sulfur may be melted with or without having been washed, and marketed as liquid or massive solid sulfur.

As previously mentioned, the water which is formed in the chemical reaction which takes place in the regeneration step must be periodically or continuously removed to prevent its build-up in the system. Under some circumstances, for example, when the feed gas is not saturated with water vapor, the amount of water lost by evaporation in the absorber, regenerator, and separator will wholly or partially balance the water formed in the process. In fact, in some instances it has been found that more water is lost by evaporation than is formed in the regeneration reaction so that it has been found necessary to add water to the system, preferably water from the washing of the filtered sulfur in order to return to the system any absorbent contained therein. In other cases the feed gas may be saturated with water vapor so that no evaporation takes place and condensation may even occur. In such instance a portion of the absorbent stream equivalent to the amount of water accumulating in the system may be periodically or continuously bled off and, if desired, processed to recover the absorbent contained therein.

The present process is applicable to the treatment of a wide variety of gas mixtures for the removal of sulfur dioxide contained therein. It is particularly well adapted to the treatment of combustion gases containing very small amounts of sulfur dioxide, e. g., 0.5 per cent or less by volume. In addition to the sulfur dioxide, such gases usually comprise nitrogen, carbon dioxide, water vapor, and possibly some carbon monoxide. None of these gases interfere with the proper functioning of the present process.

While the process has been herein described as being operated in a continuous manner, it will be apparent that batchwise or semi-continuous operation may be employed. Similarly, it will be apparent to those skilled in the art that many operating variations and engineering techniques may be applied within the scope of the invention. For example, when the feed gas comprises combustion products produced at a high temperature, as is often the case, the heat content of the gas may be utilized in a waste heat boiler or the like, and may be employed for evaporating the sulfur wash water or the absorbent side-stream which may be withdrawn to compensate for water condensed out of a saturated feed gas and/or formed in the regeneration step. Also, it will be apparent that various forms of equipment may be employed, and the design of such equipment will depend upon the conditions under which the process is carried out, the nature of the feed gas, etc.

Other modes of applying the principle of my invention may be employed instead of those explained, change being made as regards the method or materials disclosed, provided the step or steps stated by any of the following claims, or the equivalent of such stated step or steps, be employed.

I, therefore, particularly point out and distinctly claim as my invention:

1. In a cyclic process wherein (1) a sulfur dioxide-containing gas is continuously contacted with an aqueous absorbent which is buffered to a pH value between about 4 and about 6, (2) the sulfur dioxide-containing rich absorbent so obtained is continuously treated with gaseous hydrogen sulfide whereby there is obtained regenerated lean absorbent having free sulfur suspended therein, (3) said free sulfur is separated from said regenerated lean absorbent, and (4) said regenerated lean absorbent is continuously returned to the initial contacting step, said process being characterized by the formation of thiosulfate ion in said step (2) by reaction between hydrogen sulfide, sulfur dioxide and water until the concentration of thiosulfate ion in the regenerated lean absorbent reaches a substantially fixed steady state value; the improvement which consists in increasing the concentration of thiosulfate ion to a value greater than said steady state value by adding to the absorbent a compound selected from the class consisting of water-soluble thiosulfates and water-soluble alkalies, carrying out step (2) at an elevated temperature between about 40° C. and the boiling point of said absorbent, and removing the said regenerated lean absorbent having free sulfur suspended therein out of contact with free hydrogen sulfide substantially as soon as the stoichiometric amount of hydrogen sulfide has dissolved in the absorbent.

2. In a cyclic process wherein (1) a sulfur dioxide-containing gas is continuously contacted with an aqueous absorbent which is buffered to a pH value between about 4 and about 6, (2) the sulfur dioxide-containing rich absorbent so obtained is continuously treated with gaseous hydrogen sulfide whereby there is obtained regenerated lean absorbent having the free sulfur suspended therein, (3) said free sulfur is separated from said regenerated lean absorbent, and (4) said regenerated lean absorbent is continuously returned to the initial contacting step, said process being characterized by the formation of thiosulfate ion in said step (2) by reaction between hydrogen sulfide, sulfur dioxide and water until the concentration of thiosulfate ion in the regenerated lean absorbent reaches a substantially fixed steady state value; the improvement which consists in carrying out said step (2) at an elevated temperature between about 40° C. and the boiling point of said absorbent, and removing the said regenerated lean absorbent having free sulfur suspended therein out of contact with free hydrogen sulfide substantially as soon as the stoichiometric amount of hydrogen sulfide has dissolved in the absorbent.

3. The process of claim 2 wherein the treatment of the sulfur dioxide-containing rich absorbent with gaseous hydrogen sulfide is carried out at a temperature between about 40° C. and about 70° C.

4. The process of claim 2 wherein the absorbent is buffered to a pH value between about 4 and about 5, and treatment of the sulfur dioxide-containing rich absorbent with the gaseous hydrogen sulfide is carried out at a temperature between about 40° C. and about 60° C. and over a period of time less than about 15 minutes.

5. In a cyclic process wherein (1) a sulfur dioxide-containing gas is continuously contacted with an aqueous absorbent which is buffered to a pH value between about 4 and about 6, (2) the sulfur dioxide-containing rich absorbent so obtained is continuously treated with gaseous hydrogen sulfide whereby there is obtained regenerated lean absorbent having free sulfur suspended therein, (3) said free sulfur is separated from said regenerated lean absorbent, and (4) said regenerated lean absorbent is continuously returned to the initial contacting step, said process being characterized by the formation of thiosulfate ion in said step (2) by reaction between hydrogen sulfide, sulfur dioxide and water until the concentration of thiosulfate ion in the regenerated lean absorbent reaches a substantially fixed steady state value; the improvement which consists in increasing the concentration of thiosulfate ion in the absorbent to a value greater than said steady state value by adding to the absorbent a compound selected from the class consisting of water-soluble thiosulfates and water-soluble alkalies, and removing said regenerated lean absorbent having free sulfur suspended therein out of contact with free hydrogen sulfide susbtantially as soon as the stoichiometric amount of hydrogen sulfide has dissolved in the absorbent.

6. The process of claim 5 wherein the concentration of thiosulfate ion in the absorbent is increased to a value above that of the substantially fixed steady state concentration by adding a soluble thiosulfate to the absorbent.

7. The process of claim 5 wherein the concentration of thiosulfate ion in the absorbent is increased to a value above that of the substantially fixed steady state concentration by adding a soluble alkali thereto.

8. The process of claim 5 wherein the concentration of thiosulfate ion in the absorbent is greater than the substantially fixed steady state concentration and is between about 1 and about 3 moles/liter.

9. In a process for removing sulfur dioxide from a hot combustion gas mixture comprising the same the steps which comprise (1) cooling said gas mixture to a temperature such that a temperature between about 40° and about 60° C. is attained in the subsequent step (3) without the addition of substantial heat from external sources, (2) contacting the cooled gas mixture with an absorbent comprising an aqueous buffer solution having a pH value between about 4 and about 5 and containing between about 1 and 3 moles/liter of thiosulfate ion, (3) treating the sulfur dioxide-containing rich absorbent with gaseous hydrogen sulfide at a temperature between about 40° C. and about 60° C. whereby there is produced a suspension of sulfur in regenerated lean absorbent, (4) withdrawing said suspension of sulfur in regenerated lean absorbent out of contact with free hydrogen sulfide substantially as soon as the stoichiometric amount of hydrogen sulfide has dissolved in said absorbent, (5) separating said free sulfur from said regenerated lean absorbent, and (6) returning the sulfur-free regenerated lean absorbent to the initial contacting step.

10. The process of claim 9 wherein the absorbent comprises an aqueous solution of water-soluble salts of sulfosuccinic acid.

11. The process of claim 9 wherein the absorbent comprises an aqueous solution of trisodium sulfosuccinate and disodium acid sulfosuccinate.

References Cited in the file of this patent

UNITED STATES PATENTS

| Number | Name | Date |
|---|---|---|
| 927,342 | Feld et al. | July 16, 1909 |
| 1,832,325 | Rosenstein | Nov. 17, 1931 |
| 1,832,448 | Coleman et al. | Nov. 17, 1931 |
| 1,900,398 | Jacobson | Mar. 7, 1933 |
| 1,901,249 | Lincoln | Mar. 14, 1933 |
| 1,908,731 | Clark | May 16, 1933 |
| 1,915,364 | Harrell | June 27, 1933 |
| 1,919,342 | Merriam | July 25, 1933 |
| 1,925,198 | Melvill | Sept. 5, 1933 |
| 1,937,196 | Gollmar | Nov. 28, 1933 |
| 2,082,006 | Johnstone | June 1, 1937 |
| 2,142,987 | Bacon et al. | Jan. 10, 1939 |
| 2,173,877 | Clark et al. | Sept. 26, 1939 |
| 2,225,744 | Johnstone | Dec. 24, 1940 |